(12) United States Patent
Langholz et al.

(10) Patent No.: US 11,287,629 B2
(45) Date of Patent: Mar. 29, 2022

(54) METHOD FOR DETERMINING A HEIGHT POSITION OF AN OBJECT

(71) Applicant: Carl Zeiss Microscopy GmbH, Jena (DE)

(72) Inventors: Nils Langholz, Apolda (DE); Viktor Drescher, Weimar (DE)

(73) Assignee: Carl Zeiss Microscopy GmbH, Jena (DE)

(*) Notice: Subject to any disclaimer, the term of this patent is extended or adjusted under 35 U.S.C. 154(b) by 0 days.

(21) Appl. No.: 17/236,803

(22) Filed: Apr. 21, 2021

(65) Prior Publication Data

US 2021/0239953 A1 Aug. 5, 2021

Related U.S. Application Data

(63) Continuation of application No. 16/061,639, filed as application No. PCT/EP2016/080771 on Dec. 13, 2016.

(30) Foreign Application Priority Data

Mar. 2, 2016 (DE) .................. 102016103736.2

(51) Int. Cl.
*G02B 21/00* (2006.01)
*G06T 7/80* (2017.01)
(Continued)

(52) U.S. Cl.
CPC ........ *G02B 21/008* (2013.01); *G01B 11/0608* (2013.01); *G06T 7/80* (2017.01); *H04N 5/23238* (2013.01); *G06T 2207/10056* (2013.01)

(58) Field of Classification Search
None
See application file for complete search history.

(56) References Cited

U.S. PATENT DOCUMENTS 5,671,085 A 9/1997 Gustafsson et al.
5,915,048 A 6/1999 Hill et al.
(Continued)

FOREIGN PATENT DOCUMENTS

WO WO 2015/144557 A1 10/2015

OTHER PUBLICATIONS

Hiraoka, Yasushi, et al., "Determination of three-dimensional imaging properties of a light microscope system," *Biophys. J.*, vol. 57, pp. 325-333 (Feb. 1990).
(Continued)

*Primary Examiner* — Mohammad J Rahman
(74) *Attorney, Agent, or Firm* — Christensen, Fonder, Dardi & Herbert PLLC

(57) ABSTRACT

A method for determining a height position of an object at of using a microscope which images using a point-spread function along a z-direction (height direction), comprising the steps of imaging the object in the far field and determining a far-field intensity, calculating a maximum intensity expected by multiplying the far-field intensity by a scaling factor, partially confocally imaging the object with the focus in the z-direction within the depth-of-field range, and determining a partially-confocal intensity of the imaging, calculating the intensity of the point-spread function (at the first location) by forming a difference between the partially-confocal intensity and a product of the far-field intensity and a predefined combination factor, calculating the z-coordinate of the focus at a point-spread function maximum, using a previously-known form of the point spread function, its calculated intensity, and the calculated expected maximum intensity, and using the z-coordinate as the height position of the object.

14 Claims, 3 Drawing Sheets

(51) Int. Cl.
*G01B 11/06* (2006.01)
*H04N 5/232* (2006.01)

(56) References Cited

U.S. PATENT DOCUMENTS

| | | | |
|---|---|---|---|
| 6,341,035 B1 | 1/2002 | Miura et al. | |
| 8,705,172 B2 | 4/2014 | Kleppe et al. | |
| 9,426,455 B2 | 8/2016 | Horstmeyer et al. | |
| 9,497,379 B2 | 11/2016 | Ou et al. | |
| 9,864,184 B2 | 1/2018 | Ou et al. | |
| 10,162,161 B2* | 12/2018 | Horstmeyer | G02B 21/06 |
| 2004/0008515 A1 | 1/2004 | Brown et al. | |
| 2004/0149883 A1 | 8/2004 | Eda | |
| 2009/0263002 A1* | 10/2009 | Cremer | B82Y 20/00 |
| | | | 382/133 |
| 2011/0267688 A1 | 11/2011 | Kleppe et al. | |
| 2012/0081535 A1 | 4/2012 | Hayashi | |
| 2012/0257197 A1 | 10/2012 | Feldkhun et al. | |
| 2013/0308842 A1 | 11/2013 | Blanchard et al. | |
| 2014/0099007 A1 | 4/2014 | Sarkar et al. | |
| 2015/0317824 A1 | 11/2015 | Hayashi | |
| 2016/0143517 A1* | 5/2016 | Vance | A61B 1/00096 |
| | | | 600/177 |
| 2016/0238827 A1 | 8/2016 | Shroff et al. | |
| 2017/0108682 A1 | 4/2017 | Langholz et al. | |
| 2017/0307440 A1* | 10/2017 | Urban | G01N 21/84 |

OTHER PUBLICATIONS

McNally, James G., et al., "Comparison of 3D microscopy methods by imaging a well characterized test object," *SPIE*, vol. 2985, pp. 52-63 (1997).

Pawley, James B., "Handbook of Biological Confocal Microscopy," Third Edition, Chapter 13, Jan. 2006 (22 pages).

Search report IP.Com (1 page).

Search report Google (2 pages).

\* cited by examiner

METHOD FOR DETERMINING A HEIGHT POSITION OF AN OBJECT

PRIORITY CLAIM

This application is a continuation of U.S. patent application Ser. No. 16/061,639, filed Jun. 12, 2018, which is a National Phase entry of PCT Application No. PCT/EP2016/080771, filed Dec. 13, 2016, which claims priority from German Patent Application Number 102016103736.2, filed Mar. 2, 2016, the disclosures of which are hereby incorporated by reference herein in their entirety.

FIELD OF THE INVENTION

The invention relates to a method for determining a height position of an object at a lateral first location of the object by using a microscope, which images the object with a point spread function along a z-direction that coincides with the height direction. The invention further relates to a microscope for producing a partially confocal image and a wide field image of an object, wherein the microscope comprises a detector device, a pinhole device for partially confocal imaging and for imaging in wide field, a focusing device which is adapted for setting a z-position of a focus of the partially confocal image, and a control device for controlling the pinhole device, which control device is connected to the detector device.

BACKGROUND OF THE INVENTION

Methods are known from the prior art, which can be used to determine the topography of an object using an optical microscope. In particular, confocal microscopes are used herefor. In said known methods, the focus of a partially confocal image is shifted along a z-direction, i.e. along a direction of the height extension of the topography, and a partially confocal image is recorded at each z-position. The partially confocal imaging is typically provided such that the image comprises a purely confocal component and a component of a wide field. The intensity is determined for each of said images in the z-direction, which are collectively also referred to as a stack, and an intensity profile in the z-direction is calculated. On the basis of this calculated intensity profile, the maximum intensity can be determined, the z-coordinate of which coincides with the height position of the object at the measured point. In order to determine the height positions of the object over an area, the above-described method is repeated at various locations.

For determining the maximum intensity, it is typically necessary to carry out a multiplicity of measurements along the z-direction in order to obtain a proper accuracy for the intensity maximum, and, thus, the elevation of the object. For this reason, the method can require with a great expenditure of time.

US 2004/0008515 A1 relates to an improvement of fluorescence illumination for three-dimensionally resolving microscopy. The publication Hiraoka Y. et al., Biophys. J., Vol. 57, February 1990, pp. 325-333, explains the ascertainment of the three-dimensional imaging properties in an optical microscope. McNally J. et al., SPIE, Vol. 2984, 1997, pp. 52-63, compare several 3D microscopy methods using an accurately known test object.

SUMMARY OF THE INVENTION

It is an object of the invention to provide a system for the quick determination of a height position of an object.

In a method for determining a height position of an object at a lateral first location of the object by using a microscope, which images the object with a point spread function along a z-direction that coincides with the height direction, the following steps are performed: imaging the object using the microscope in wide field and determining a wide field intensity, calculating a maximum intensity that is expected at the first location by multiplying the wide field intensity by a predetermined scaling factor, partially confocally imaging the object at the first location with the focus located at a measurement position in the z-direction, wherein the partially confocal image defines a depth of field range and the focus is located within the depth of field range, and determining a partially confocal intensity of the partially confocal image at the first location, calculating an intensity corresponding to the point spread function at the first location by way of subtraction between the partially confocal intensity and the product of wide field intensity and a predetermined linking factor, computing a z-coordinate of the focus in the z-direction at which the point spread function is maximum using a predetermined form of the point spread function, the intensity corresponding to the calculated point spread function and the calculated expected maximum intensity, and using the z-coordinate as the height position of the object at the first location.

The method is preferably used to determine a topography of a laterally extending object. To this end, the elevation at a plurality of first locations can be determined, wherein the first locations have a lateral distance from one another. The first locations consequently relate in particular to the lateral extent of the object. The first locations are preferably spaced apart perpendicularly to the z-direction.

The method is preferably used in a scanning manner, wherein the claimed method or parts of the method is/are performed at each scanning point, which can correspond to the first location. The topography of the object can be determined from the height positions of the individual first locations.

The microscope is in particular adapted to image the object in a partially confocal manner. Partially confocal in this context is intended to mean that the pinhole limits imaging in the z-direction, but not in diffraction-limited manner. Then, the size of the pinhole determines the region of the first location in the z-direction that is imaged by the partially confocal imaging. As is generally known, the resolution in the z-direction increases as the size of the pinhole decreases.

Confocal imaging in this context is intended to mean that the pinhole has an extent that corresponds to the diffraction limit of the imaging. Partially confocal imaging in particular comprises components of a purely confocal image and of the wide field image. In partially confocal imaging the pinhole is in particular larger than in confocal imaging. Partially confocal imaging serves in particular for capturing a so-called composite image.

The microscope, in particular the optics thereof and the size of the pinhole, determines the depth of field range in the z-direction. The depth of field range is thus a property of the microscope which can be determined in advance by known methods.

The object in particular has a topography whose height variation is in the nanometer to millimeter range. The object can be any sample which can be optically imaged. The object can in particular be a biological sample.

The partially confocal image defines the depth of field range. The depth of field range depends on the size of the pinhole, wherein the depth of field range in the z-direction increases as the size of the pinhole increases. Consequently, confocal imaging has a smaller depth of field range in the z-direction than partially confocal imaging. Further, the depth of field range of a partially confocal imaging is smaller than the depth of field range of a wide field imaging. If the size of a confocally imaging pinhole is decreased further, the depth of field range does not change, but only the intensity of the confocal image is reduced.

A wide field imaging is intended to mean in particular an imaging of the object which has no, or a low, spatial resolution in the z-direction. This can be done by providing no pinhole, or a pinhole having a large diameter, in an imaging beam path which represents the beam path of the light, from emission or reflection at the first location to a detector device of the microscope. After wide field imaging, the intensity thereof is determined, which corresponds to the wide field intensity.

Wide field imaging can be performed at the first location or at any other location of the object and preferably serves for capturing the optical properties, such as for example the reflectance of the sample. The wide field intensity is preferably determined only once, such that, when the method is repeated, the wide field intensity of a previous measurement is utilized. Determining the wide field intensity only once is suitable in particular if the object is one whose optical properties, in particular the reflectance, are constant or approximately constant or change by less than 10%, 20% or 50% over the extent of the object. Consequently, if the method illustrated here is repeated, preferably wide field imaging of the first location is performed only once.

As a further step of the method, the maximum intensity expected at the first location is calculated, which corresponds to the maximum intensity that was obtained in partially confocal imaging or confocal imaging. This calculation is based on the finding that the maximum intensity in confocal or partially confocal imaging is proportional to the wide field intensity. This relationship corresponds to the scaling factor, which is preferably determined in advance for the microscope, and in particular on the object. The calculation of the expected maximum intensity at the first location can be performed only once if the determination of the wide field intensity is likewise performed only once. For this reason, the determination of the expected maximum intensity must not be performed again upon repetition of the method.

The partially confocal imaging of the object at the first location is performed upon repetition of the method in particular at each of the first locations. The focus of this image is provided at a z measurement position which is situated in the depth of field range of the partially confocal imaging of the microscope. In particular, the z measurement position is situated in a depth of field range which is established by confocal imaging. The choice of the z measurement position is preferably random, or the same z measurement position is used for the partially confocal imaging at each of the first locations. Establishing the z measurement position such that it is situated in the depth of field range of the partially confocal image can be effected by trial and error or manually. In particular, other known parameters of the object or of the microscope can be used to determine the depth of field range of the partially confocal imaging. The partially confocal intensity determined from the partially confocal imaging can preferably be used to discover whether the z measurement position is situated in the depth of field range. If this is not the case, this method step can be repeated until it is certain that the z measurement position is located in the depth of field range of the partially confocal imaging.

The partially confocal imaging is preferably performed by providing a pinhole in the imaging beam path. The partially confocal imaging consequently has a better resolution in the z-direction as compared to the wide field image. Due to the fact that the point spread function for the microscope can be determined, in particular the precise profile of the point spread function is known, for example the deviation of the point spread function from a Gaussian curve and the standard width. Purely confocal imaging preferably images the object with the point spread function.

The maximum intensity of the point spread function is referred to in particular as the intensity corresponding to the point spread function. The z measurement position in the z-direction which coincides with the maximum intensity of the point spread function can be calculated based on the assumption that the intensity of a partially confocal imaging at the first location is equal to the sum of the intensity of a confocal imaging at the first location and the wide field intensity multiplied by a linking factor. The linking factor is determined preferably before performing the method, for example for the observed object or generally for the microscope. From this relationship it is possible to calculate from the measured variables, specifically the partially confocal intensity and the wide field intensity, the intensity corresponding to the point spread function at the first location. This method step is preferably performed during the topography ascertainment for each first location.

The desired z-coordinate is the position of the focus in the z-direction at which the intensity of the point spread function is maximum. It is calculated using the information relating to the form of the point spread function and two points which are known of the point spread function. This is possible since the point spread function in the z-direction coincides with the intensity profile of a confocal image. The calculation of the position at which the point spread function is maximum can be performed for example by fitting the point spread function to the two known points.

One of these two known points corresponds to the intensity of the partially confocal imaging corresponding to the point spread function and the other corresponds to the expected maximum intensity which was determined previously, as described above. The z-coordinate of the focus at which the intensity profile of the point spread function is maximum is the height position of the object at the first location.

In the determination of the position for which the point spread function is maximum, an ambiguity may arise, but can be resolved as described below. Optionally, this problem can be solved by way of the determined z-coordinate of the focus being compared to previously determined z-coordinates, for example by using the z-coordinate of the two determined z-coordinates that is closest to the previous measurement as the true position. It is moreover possible for further information that is known of the object to be used to resolve the ambiguity.

Preferably only one partially confocal imaging step is performed for determining the height position of the object at the first location. Since in known methods for optically determining the topography of an object z-stacks of typically ten or more partially confocal images with foci which are spaced apart in the z-direction must be recorded and these measurements are performed sequentially, the invention reduces the duration for determining the height position at the location of the object to up to 10% as compared to known methods. It is in particular possible with the method to record a single partially confocal image for each first location such that, using known confocal imaging methods, not only a two-dimensional image but even a three-dimensional image of the object can be produced.

It is preferred that for the partially confocal imaging a pinhole device having an opening which is greater than a diffraction limit is used, such that the intensity of the partially confocal imaging comprises components of a wide field image.

An advantage of this embodiment is that the intensity profile of the partially confocal imaging depending on the z-position has a larger depth of field range as compared to a purely confocal image, i.e. an image in which the pinhole has an opening that corresponds to the diffraction limit. The depth of field range in this embodiment is consequently larger and is easier to set. Moreover, greater height differences can be determined.

It is preferred that the scaling factor is determined by performing the following steps: producing a z-stack by repeatedly shifting the focus position in the z-direction and partially confocal imaging a lateral first calibration location of a first calibration object or of the object at each focus position, and determining the partially confocal intensities for each of the partially confocal images thus obtained; calculating a z-direction intensity profile at the first calibration location, and determining a maximum calibration intensity of the intensity profile at the first calibration location; imaging the first calibration location with the microscope in wide field, and determining a first calibration wide field intensity at the first calibration location; and calculating the scaling factor as a ratio between the maximum calibration intensity and the first calibration wide field intensity.

The scaling factor can be determined either on a first calibration object, which differs from the object, or on the object itself. The first calibration object preferably has similar optical properties as the object to be measured, especially with respect to reflection and scattering of light. In particular, the object and the first calibration object may deviate with respect to their optical properties by less than 10%, 20% or 50%. The use of a first calibration object has the advantage that the determination of the scaling factor does not need to be performed every time before the method. Ascertaining the scaling factor on the object to be measured itself, on the other hand, has the advantage that the scaling factor is determined with a particularly great accuracy. The scaling factor is determined in particular before the method is performed, as was described above.

The first calibration location can be any desired location of the first calibration object or of the object. It is possible for example for the first calibration location to coincide with the first location, for example if the determination of the scaling factor is performed right before the described method is performed.

To determine the scaling factor, the z-direction intensity profile of the partially confocal image is determined. Here, a pinhole is provided in the imaging beam path, the opening of which has a size as is used in the method described below. For the partially confocal imaging, a pinhole is in particular used which is used both for determining the scaling factor and also for determining the height position of the object at the first location.

The plurality of partially confocal images having foci shifted in the z-direction form a z-stack and the partially confocal intensity is determined for each partially confocal image, such that the intensity profile in the z-direction can be determined therefrom. The maximum calibration intensity is calculated on the basis of said intensity profile and correlated to the likewise captured calibration wide field intensity, which was determined at the first calibration location. In particular, the scaling factor is the ratio of the maximum calibration intensity to the first calibration wide field intensity. The calibration wide field intensity is ascertained in particular like the wide field intensity determined above.

It is preferred that the linking factor is determined by performing the following steps: partially confocally imaging a lateral second calibration location of a second calibration object or of the object with the focus located at a calibration measurement position in the z-direction which position is within the depth of field range, and determining a partially confocal calibration intensity of the partially confocal image at the second calibration location; confocally imaging the second calibration location with the focus located at the calibration measurement position, and determining a confocal calibration intensity of the confocal image at the second calibration location; imaging the second calibration location with the microscope in wide field, and determining a second calibration wide field intensity at the second calibration location; and calculating the linking factor as a ratio between the difference between the partially confocal calibration intensity and the confocal calibration intensity to the second calibration wide field intensity.

The second calibration object can be identical with the first calibration object. In particular, the second calibration object is embodied similarly to the object with respect to reflection and scattering of light, for example the optical parameters differ by less than 10%, 20% or 50%. However, determination of the linking factor is preferably performed on the object itself. To this end, a partially confocal image is produced at an arbitrarily chosen second calibration location, which can coincide with the first calibration location or the first location. In particular, the size of the pinhole in the imaging beam path is the same as in the above-described method. The pinhole is preferably identical to the above-described method which is performed after the linking factor was determined.

The confocal imaging is performed with a pinhole whose diameter corresponds to the diffraction limit of the imaging. The pinhole for the partially confocal imaging is thus larger than the pinhole for the confocal imaging. The confocal calibration intensity of the confocal image, determined at the second calibration location, corresponds to a calibration intensity corresponding to the point spread function, because the point spread function is obtained in confocal imaging.

The second calibration wide field intensity can coincide with the first calibration wide field intensity if it is determined at the same location as the first calibration wide field intensity. In particular, the step of imaging the second calibration location of the microscope in wide field and determining a second calibration wide field intensity at the second calibration location can be omitted if the first calibration location coincides with the second calibration location.

The calculation of the linking factor is performed inversely to the determination of the intensity corresponding to the point spread function on the basis of the above-described relationship between intensity of the partially confocal image, intensity of the confocal image and wide field intensity.

It is preferred that the first location is imaged with the microscope in wide field and a current wide field intensity is determined at the first location.

In particular, upon repetition of the above-described method, a wide field image is recorded at each of the first locations and consequently the wide field intensity at each first location is determined. This procedure has the advantage that, if the object exhibits strong variations with respect to optical properties along the extent of the object, specifically with respect to reflectance or scattering of light, the appropriate wide field intensity is used in each case. This, thus, increases the accuracy of the method by determining the wide field intensity at each first location.

It is preferred for the method furthermore to have the following steps: partially confocally imaging the first location with the first focus at least at two z measurement positions which are spaced apart in the z-direction and are situated in each case within the depth of field range, and determining partially confocal intensities for each partially confocal image at the first location; calculating the intensities corresponding to the point spread function at the first location by way of a respective difference between the respective partially confocal intensity and a product of wide field intensity and the predefined linking factor; calculating the z-coordinate of the focus in the z-direction at which the point spread function is maximum using the form of the point spread function, the calculated intensities corresponding to the point spread function and the calculated expected maximum intensity.

In this preferred embodiment, two or more partially confocal images of the location are taken, wherein the foci of the partially confocal images are spaced apart in the z-direction. The size of the pinhole is preferably identical for each partially confocal image. Two partially confocal images and the corresponding determination of the partially confocal intensities make it possible for the position at which the point spread function is maximum to be determined on the basis of three points, specifically the two intensities corresponding to the point spread function and the maximum intensity of the point spread function. It is consequently possible to reliably resolve the ambiguity of the above-described method.

It is preferred that, for producing a live determination of a height profile of the object at a laterally second location of the object, which differs from the first one, the second location is imaged in partially confocal fashion and that, for calculating a z-coordinate of the focus in the z-direction at the second location, the z-coordinate of the focus in the z-direction at the first location is taken into consideration.

In this embodiment, the information relating to the height position of the object at a previous point is used to resolve the ambiguity of the above-described method. Provision is made in particular to use the z-coordinate that is closest to the previous measurement as a true z-coordinate. The second location can be any desired location on the object that is distant from the first location. In particular, the second location can be selected by a user of the microscope.

Since for this embodiment the second location is imaged in partially confocal fashion only once, this embodiment is particularly fast, with the result that it is even possible to display to the observer live images of the elevation of the object. This is helpful in particular if the user can manually select the second location. It is also possible for the manually selected second locations to be linked together to form a topography image of the object.

It is preferred for the method furthermore to comprise the following steps: partially confocally imaging the first location with at least two different pinholes and with the focus at a z measurement position in the z-direction which is situated within the depth of field range, and determining a further partially confocal intensity for the partially confocal image with the further pinhole; and calculating the z-coordinate using the point spread function, the calculated intensity corresponding to the point spread function, the further partially confocal intensity and the calculated expected maximum intensity.

In this embodiment, which can be used in addition or as an alternative to the previously mentioned embodiments, two partially confocal images are recorded at the first location, wherein the partially confocal imaging is performed with differently sized pinholes. An intensity corresponding to the point spread function is preferably calculated only for one of the partially confocal images, as has been explained above. The further partially confocal intensity may be used to resolve the above-described ambiguity. The further partially confocal intensity can be used to determine the slope side of the image point spread function on which the intensity corresponding to the point spread function is situated.

The advantage of this embodiment is that for determining the height position of the object at the first location, the focus of the partially confocal image does not need to be changed, but only the size of the pinhole.

It is preferred to use a laser scanning microscope as microscope, wherein, for partially confocal imaging and imaging in wide field, the size of the pinhole is changed by adjusting or exchanging the pinhole.

The laser scanning microscope used can comprise a pinhole device in which the size of the pinhole can be adjusted manually or automatically. This embodiment of the method in particular uses a laser scanning microscope having only one detector, which records both the partially confocal image and the image in wide field. Moreover, it is possible in this embodiment to determine the ambiguity in the determination of the height position of the object at the first location by way of two images using pinholes of different sizes.

It is preferred to use a laser scanning microscope as a microscope, wherein, for partially confocal imaging and imaging in wide field, two detectors are provided behind pinholes of different size.

This embodiment can be implemented as an alternative or in addition to the previously described embodiment. For each of two detectors, which can be part of one detector device, one pinhole of individual size is provided. The two pinholes in particular form one pinhole device. The greater one of the two pinholes is specifically provided for producing an image in wide field, while the smaller pinhole can be used to produce the partially confocal image.

It is a preferred advantage of this embodiment that the wide field image and the partially confocal image can be produced at the same time, for example by providing a beam splitter. Consequently, it is possible in this embodiment for the wide field intensity to be determined simultaneously with the partially confocal intensity in each determination of the elevation at the first location, with the result that the method in this embodiment of the microscope is particularly fast.

It is preferred that a laser scanning microscope be used as microscope, wherein a wide field camera is used for imaging in wide field.

In this configuration, the laser scanning microscope is provided with a wide field camera, onto which a fraction of the radiation of the imaging beam path is directed, for example using a beam splitter. Preferably, the image in wide field and the partially confocal image are laterally and vertically overlaid. In this configuration it is in particular possible for the partially confocal image and the image in wide field to be recorded at the same time.

It is preferred that a confocal topography microscope is used as the microscope, in which a grating is used as pinhole, wherein a first camera with the grating is used for partially confocal imaging and a second camera is used for imaging in wide field.

Confocal topography microscopes serve in particular for determining the topography of an object, wherein the object is imaged in a large wavelength range. Confocal topography microscopes are known from the prior art. In contrast therewith, this embodiment provides a beam splitter which directs the imaging radiation onto the first camera and the second camera in the imaging beam path. Using the first camera and the grating which is provided in front of it produces a partially confocal image of the object, whereas the second camera takes a wide field image of the object. It is once again advantageous here that the partially confocal image and the image in wide field can be recorded simultaneously. The grating can be part of a pinhole device, while the first camera and second camera can be part of a detector device.

It is preferred that a confocal Airy microscope is used as the microscope, in which the object is imaged onto a detector device which comprises a plurality of pixels and resolves a diffraction structure of the partially confocal image, wherein the wide field intensity and the partially confocal intensity are determined from one recording.

Airy microscopes make it possible to image the first location of the object such that the diffraction structure of the image can be resolved using the pixels of the detector device. Since the diffraction profile of the imaging is present on the detector, it is possible for the partially confocal intensity and the intensity in wide field imaging to be captured at the same time on the same detector device. It is thus possible for the partially confocal image and the image in wide field to be recorded at the same time.

It is preferred that a confocal Airy microscope is used as the microscope, in which the object is imaged onto a detector device which comprises a plurality of pixels and resolves a diffraction structure of the partially confocal image, wherein a wide field camera is used for imaging in wide field.

In this configuration, the Airy microscope is provided with a wide field camera, onto which a component of the radiation of the imaging beam path is directed, for example using a beam splitter. The image in wide field and the partially confocal image are here preferably laterally and vertically overlaid. In this configuration it is in particular possible for the partially confocal image and the image in wide field to be recorded at the same time.

The invention furthermore relates to a microscope for producing a partially confocal image and a wide field image of an object, wherein the microscope comprises a detector device for capturing the image of the object, a pinhole device for providing partially confocal imaging and a recording in wide field, a focusing device which is embodied for setting a focus of the partially confocal image, and a control device for controlling the pinhole device, which is connected to the detector device. The microscope images the object in a z-direction, which coincides with the height direction of the object, with a point spread function. The control device is embodied to perform the method as has been explained above.

The microscope can be a laser scanning microscope, an Airy microscope or a confocal topography microscope. The microscope can comprise a light source which provides white light or light of a specific wavelength, depending on what is necessary for imaging the object. The detector device in particular comprises detectors which can be used to convert incident radiation into electrical signals, wherein said electrical signals can be passed on to the control device.

The pinhole device preferably comprises a pinhole, which can be used to image the object in partially confocal fashion onto the detector device. The pinhole size can be adjustable, with the result that the pinhole device can also be used to produce an image in wide field. Alternatively, the pinhole can be removed from the imaging beam path, with the result that a wide field image is taken, then. In the topography microscope, preferably a plurality of pinholes or gratings are provided, which are arranged on a mask that is movable laterally in the imaging beam path. Here, the pinholes have different diameters, or the gratings have different grating constants.

The focusing device is adapted to adjust the focus of the partially confocal image. To this end, the focusing device can comprise optics which can be used to change the position of the focal plane at the object. Alternatively, the focusing device can move the object along the z-direction and consequently change the position of the focal plane of the imaging. Ultimately, only a relative displacement between focal plane and object is important.

The microscope can further comprise a positioning device which is adapted to displace the first location with respect to the detector device laterally. The positioning device can be embodied as a scanner, which can be used to move the object with respect to the detector device. Alternatively, the beam path can be modulated, for illuminating the object, such that, as a consequence, the first location can be changed with respect to the detector device; this is implemented for example in a laser scanning microscope.

It is preferred for the detector device to comprise a first detector for the partially confocal imaging and a second detector for imaging in wide field.

The control device in particular serves for controlling the above-mentioned devices and for performing the previously described method. In particular, the considerations, preferred embodiments and advantageous with respect to the method analogously apply with respect to the microscope.

It goes without saying that the aforementioned features and those yet to be explained below can be used not only in the combinations specified but also in other combinations or on their own, without departing from the scope of the present invention.

BRIEF DESCRIPTION OF THE DRAWINGS

The invention is explained in more detail below for example on the basis of the accompanying drawings, which also disclose features essential to the invention. In the figures.

DETAILED DESCRIPTION

Figure 1:
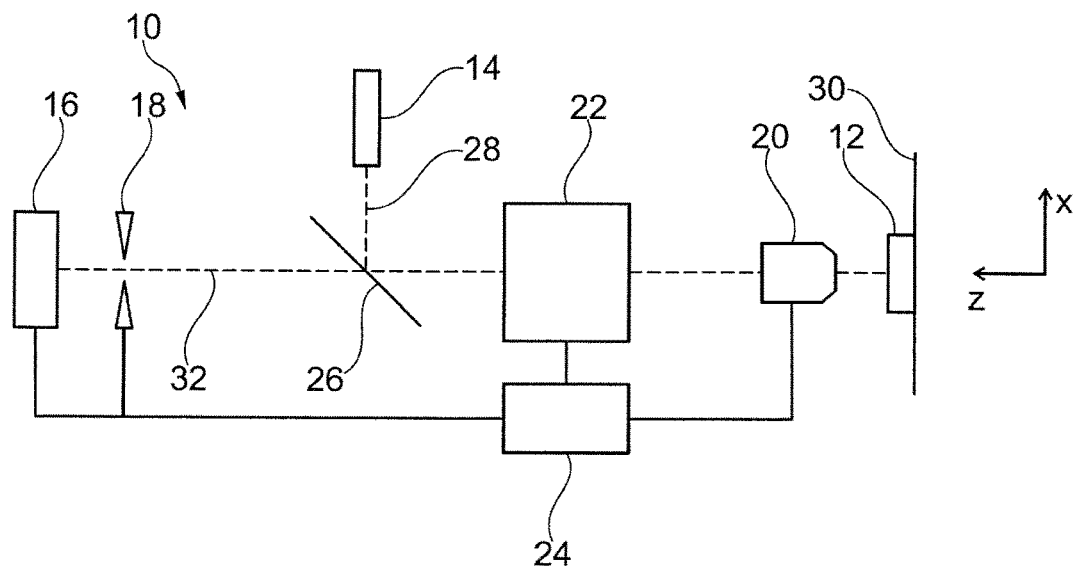
FIG. 1 shows a laser scanning microscope as a first embodiment of a microscope for performing a method for ascertaining an elevation of an object.

A laser scanning microscope 10 serves for the scanning imaging of an object 12, wherein a method, described below, for determining height position of the object 12 can be performed on the laser scanning microscope 10.

The laser scanning microscope 10 comprises a light source 14, a detector device 16, a pinhole device 18, a focusing device 20, a positioning device 22, a control device 24 and a beam splitter 26.

The light source 14 is e.g. a laser, a light-emitting diode (LED) or another monochrome light source that emits light of a wavelength that excites fluorescent dyes in the object 12 to emit fluorescent light. Radiation of an illumination beam path 28, produced by the light source 14, is directed onto the beam splitter 26, which is provided in the form of a dichroic mirror. The beam splitter 26 reflects the light of the illumination beam path 28 onto the positioning device 22.

The positioning device 22 comprises a scanner, i.e. two movably mounted mirrors, which are not illustrated in FIG. 1. Using the scanner, the positioning device 22 can direct the illumination beam path 28 onto different locations of the object 12. The deflection of the illumination radiation is controlled by the control device 24, which is connected to the positioning device 22. In particular, the positioning device 22 guides the illumination beam path 28 in scanning fashion over the object 12. Alternatively, a sample stage carrying the object 12 is shifted.

The illumination beam path 28 travels from the positioning device 22 to the focusing device 20, which is provided in the form of an objective. The focusing device 20 is used to shift the focus of the illumination beam path 28 on the object 12 in a z-direction. The z-direction coincides with the height direction of the object 12 and is perpendicular to a lateral extension of the object 12, which is defined by an x- and y-direction. The focusing device 20 comprises a plurality of lenses, which are movable with respect to one another and are actuated e.g. using an electric motor. The focusing device 20 is likewise connected to the control device 24, with the result that the control device 24 can change the focus of the laser scanning microscope 10. The focus coincides with a z measurement position of the laser scanning microscope 10. The illumination beam path 28 travels from the focusing device 20 to the object 12, which is attached to a sample holder 30.

The focusing device 20 can be used to shift the focus in the z-direction. Using the positioning device 22, the focus of the illumination beam path 28 can be laterally shifted in an x-direction and a y-direction, which are both perpendicular to the z-direction.

Provided in the object 12 are fluorescent dyes, which are excited by the illumination radiation and emit light into an imaging beam path 32. If the object 12 contains no fluorescent dyes, the illumination beam path is partially reflected by the object 12 into the imaging beam path 32. Up to the beam splitter 26, the imaging beam path 32 travels in the opposite direction of the illumination beam path 28. Due to the fact that the fluorescent light has a different wavelength than the illumination radiation, the radiation in the imaging beam path 32 can pass through the dichroic beam splitter 26 and pass to the pinhole device 18, which has a pinhole of adjustable size. Alternatively, a partially reflective beam splitter can be provided instead of the dichroic beam splitter 26, especially if the illumination radiation is reflected by the object 12. In particular, the pinhole device has an electric motor that continuously or incrementally changes the size of the pinhole. The pinhole device 18 is connected to the control device 24, with the result that the control device 24 sets the size of the pinhole.

The pinhole is situated in an intermediate image plane of the imaging beam path 32. Arranged downstream thereof is the detector device 16, which comprises a detector for converting the radiation of the imaging beam path 32 to electrical signals. The electrical signals are passed on to the control device 24, which can determine therefrom the intensity of the radiation in the imaging beam path 32.

The laser scanning microscope 10 produces a partially confocal image by setting the pinhole of the pinhole device 18 to be small, for example 50-300% greater than a pinhole that images the object 12 in diffraction-limited fashion. To produce a wide field image, the pinhole of the pinhole device 18 is further enlarged as compared to the partially confocal imaging, with the result that the image predominantly comprises wide field components.

Figure 2:
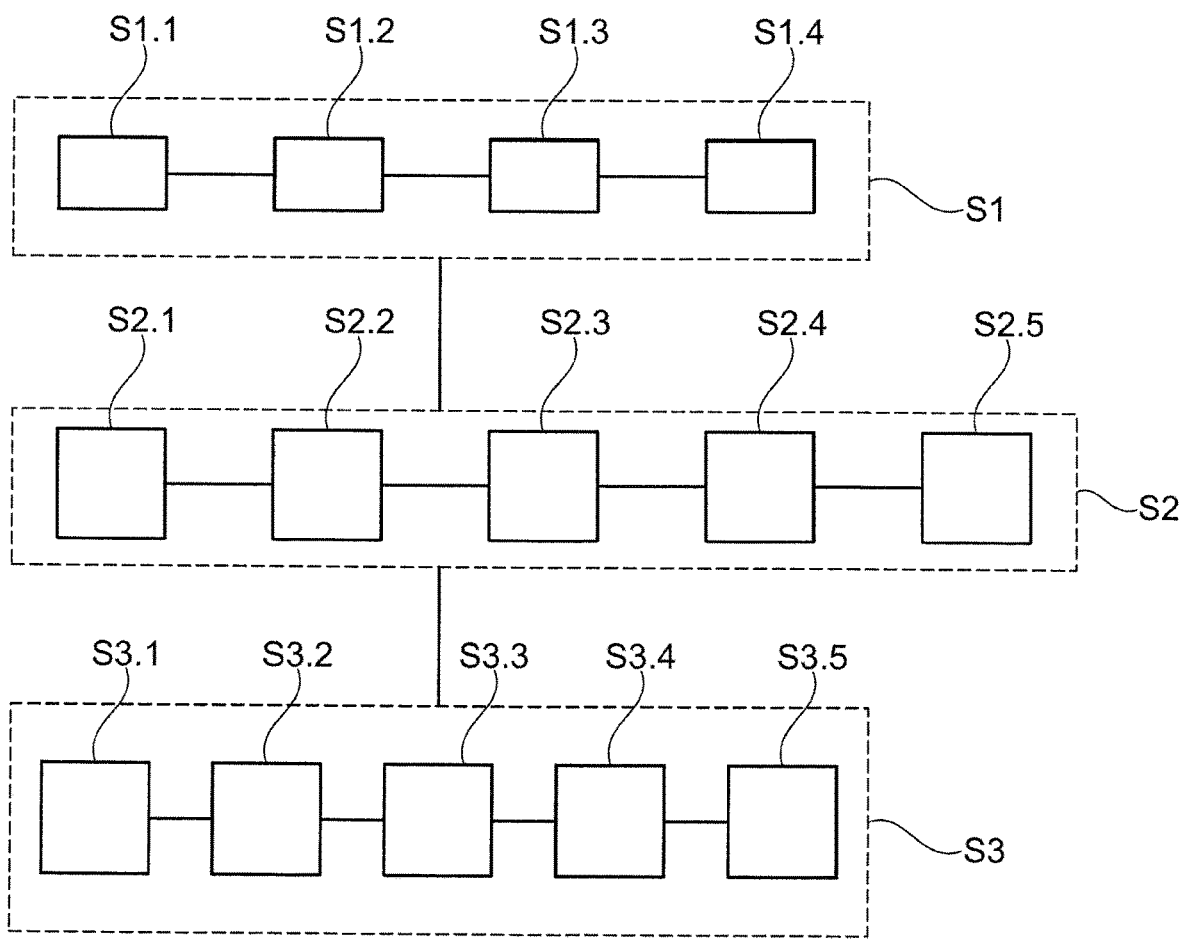
FIG. 2 shows a block illustration for illustrating the method steps.

The method for operating the laser scanning microscope 10 is explained using the block diagram in FIG. 2. The method is used to determine a height position of the object 12 at a first location of the object 12. The first location can be any location of the object 12. The method is in particular repeated at a plurality of first locations, such that a plurality of elevations of the object 12 can be determined, from which the topography of the object 12 can be derived.

The method comprises three fundamental steps: Step S1 serves for calibrating a scaling factor Sk, step S2 serves for calibrating a linking factor Vk, and step S3 serves for calculating the height position of the first location.

First, the calibration of the scaling factor Sk in step S1 will be explained. The calibration of the scaling factor Sk can be performed on the object 12 or on a calibration object that has in particular similar properties with respect to reflection and scattering of light as the object 12. In the following exemplary embodiment, the calibration of the scaling factor Sk at a calibration location, which is a site on the object 12, will be discussed. The calibration location is an example of the first calibration location.

Figure 3:
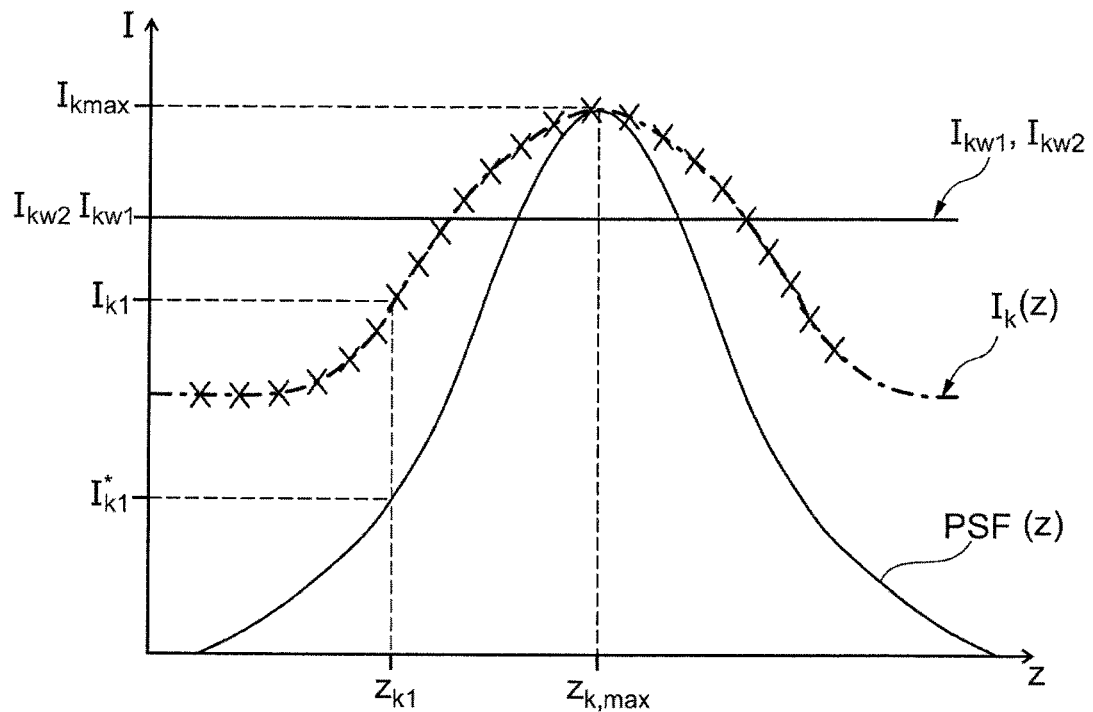
FIG. 3 shows a diagram for illustrating the calibration of the method.

In step S1.1, a z-stack of a plurality of partially confocal images is recorded at the calibration location. The images cover the depth of field range of the partially confocal image, wherein the pinhole device 18 sets a first pinhole size. The intensity is determined for each partially confocal image, such that an intensity distribution $I_K(z)$ is obtained in dependence on the measurement position z of the focus in step S1.2. This is illustrated by way of example in FIG. 3. On the basis of the intensity profile $I_k(z)$, the maximum calibration intensity $I_{k,max}$ can be determined at the position of the focus $z_{k,max}$.

In step S1.3, a calibration wide field intensity $I_{KW1}$ is determined by setting the pinhole device 18 to a second size for the pinhole, which is greater than the first size. The second size of the pinhole is such that the intensity of the wide field image dominates in the image. The second size is 5 to 10 times greater than the first size, for example. In step S1.4, the scaling factor Sk satisfying the following equation is calculated:

$$Sk = \frac{I_{k,max}}{I_{kW1}} \qquad (1)$$

In the substep S2.1 of step S2, a point spread function PSF(z) in the z-direction of the laser scanning microscope 10 is determined. This step is not necessary if the point spread function PSF(z) for the laser scanning microscope 10 is already known. In step S2.2, partially confocal imaging of the second calibration location is performed on a second calibration object, which can coincide with the first calibration object, or at a second calibration location on the object 12, optionally coinciding with the first calibration location. The size of the pinhole is set to the first size. The focus of the partially confocal image is situated at a calibration measurement position $z_{k1}$ which is located in the depth of field range of the partially confocal image. Next, a partially confocal calibration intensity $I_{k1}$ of the partially confocal image of the second calibration location is determined at the calibration measurement position $z_{k1}$.

In step S2.3, confocal imaging of the second calibration location is performed. The focus of the confocal image is likewise situated at the calibration measurement position $z_{k1}$. Next, a confocal calibration intensity $I_{k1}*$ of the confocal image of the second calibration location is determined at the calibration measurement position $z_{k1}$. For confocal imaging, the size of the pinhole of the pinhole device 18 is set such that it is at imaging diffraction limit. The confocal calibration intensity $I_{k1}*$ coincides with the intensity of the point spread function PSF(z) at the calibration measurement position $z_{k1}$.

In step S2.4, a calibration wide field intensity $I_{KW2}$ is also determined. This is done analogously to the determination of the calibration wide field intensity $I_{KW1}$ in step S1.3.

The linking factor Vk is determined in step S2.5 from the partially confocal calibration intensity $I_{k1}$, the confocal calibration intensity $I_{k1}*$ and the calibration wide field intensity $I_{kW2}$ in accordance with the following equation:

$$I_{k1} = I^*_{k1} + Vk \times I_{kW2} \qquad (2)$$

The following text explains how the topography in the calibrated laser scanning microscope 10 is determined in step S3. To this end, in step S3.1, the laser scanning microscope 10 partially confocally images the first location, wherein the focus is situated at a z measurement position $z_1$ located in the depth of field range. The pinhole is here set to the first size. Next, the partially confocal intensity $I_1$ is determined. From the partially confocal intensity $I_1$, the partially confocal intensity $I_1*$ that corresponds to the point spread function PSF is calculated in step S3.2 using the linking factor Vk and the above-described equation (2). The intensity $I_1*$ that corresponds to the point spread function PSF corresponds to the intensity of the point spread function PSF at the z measurement position $z_1$.

At the z measurement position $z_1$, further partially confocal imaging is performed in step S3.3, in which the pinhole is changed with respect to the first performed partially confocal imaging. To this end, the pinhole can be embodied to be adjustable in terms of size or pinholes are exchanged. From said further partially confocal imaging using a different pinhole, a further partially confocal intensity $I_{1,pin}$ can be calculated.

By enlarging the pinhole of the pinhole device 18, a wide field image of the first location is produced in step S3.4, as described above, and the wide field intensity $I_W$ is determined therefrom. Using equation (1) and the scaling factor Sk, the maximum intensity $I_{max}*$ of the point spread function PSF is calculated.

Figure 4:
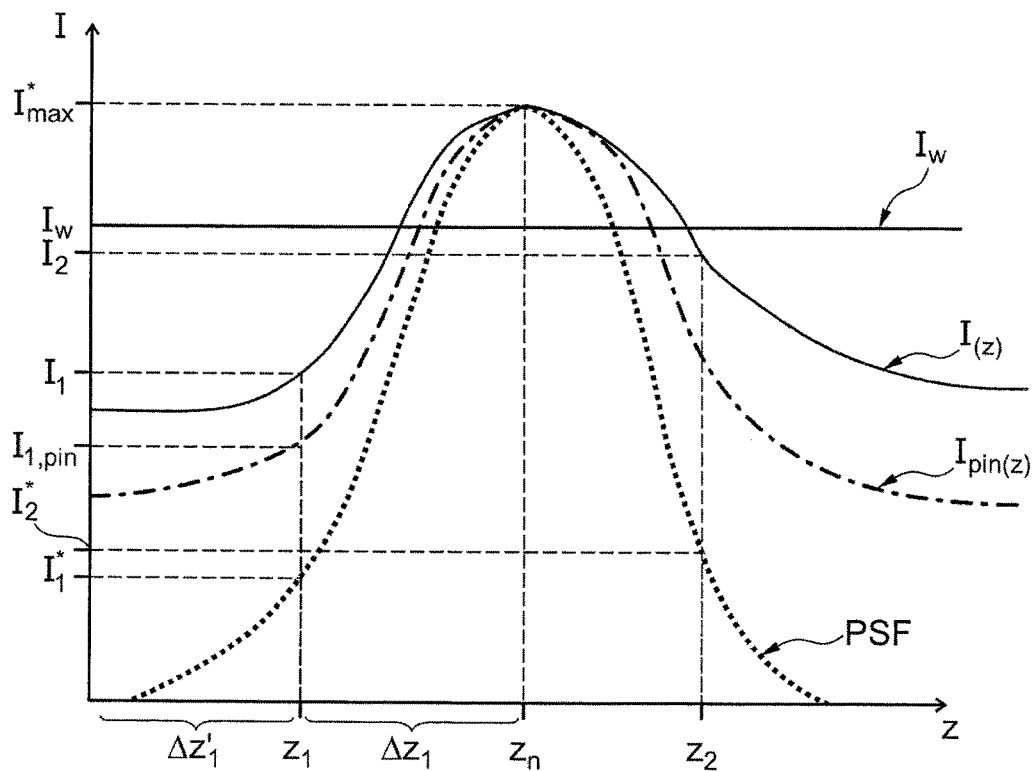
FIG. 4 shows a diagram for illustrating the determined and measured intensities used for the method.

From the linking factor Vk, the expected maximum intensity $I_{max}*$ and the intensity $I_1*$ which corresponds to the point spread function PSF, a z-coordinate $z_h$ of the focus, which coincides with the z-coordinate of the maximum intensity $I_{max}*$ of the point spread function PSF, is determined in step S3.5 using equation (2). Since only two values are used for the determination, the determination is not always unique, as is indicated in FIG. 4 by the two regions in the z-direction $\Delta z_1$ and $\Delta z_1'$. Using the further partially confocal intensity $I_{1,pin}$ it is now possible to determine the profile of the point spread function PSF, so that it is possible to establish which of the distances $\Delta z_1$ and $\Delta z_1'$ is the correct one, so that the z-position $z_h$ can be determined unambiguously. The z-coordinate $z_h$ of the focus corresponds to the height position of the object 12 at the first location. Steps S3.1 to S3.5 are repeated at each of the locations to be measured, whereas steps S1 to S2 are performed only once.

Figure 5:
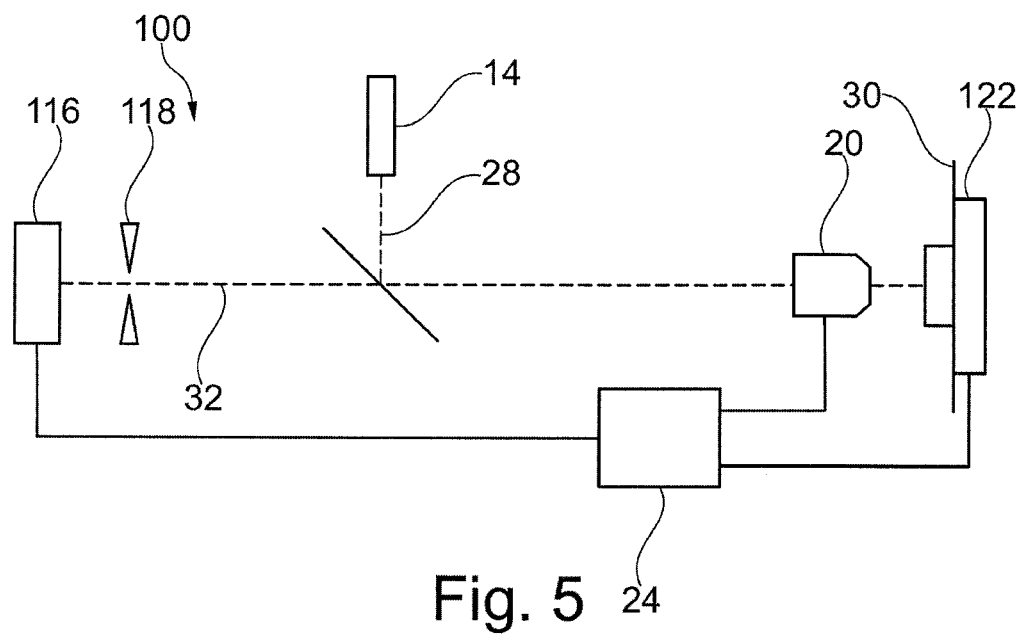
FIG. 5 shows an Airy microscope as a second embodiment of the microscope for performing the method.

A second embodiment of a microscope for performing the method is schematically illustrated in FIG. 5. Here, an Airy microscope 100 is used, the schematic setup of which coincides with the laser scanning microscope 10, except for the following differences that are shown:

A positioning device 122 of the Airy microscope 100 does not operate by way of deflecting the radiation of the illumination beam path 28, but by moving the object 12 with respect to the illumination beam path 28 using a scanner, which forms the positioning device 122. The scanner moves the sample holder 30. However, it is also possible to use a positioning device 122 as described in the laser scanning microscope 10. The positioning device 122 is again connected to the control device 24 here, such that the control device 24 can set the positioning of the object 12 with respect to the illumination beam path 28.

A detector device 116 comprises a plurality of pixels to resolve the diffraction structure of the partially confocal image.

The mode of operation of the Airy microscope 100 does not differ from the mode of operation of the laser scanning microscope 10 with respect to the principle of determining the height position at the first location of the object 12. Only the manner of producing the partially confocal image and the wide field image differs.

Since the diffraction structure can be resolved using the detector device 116, the intensities of a single partially confocal image that are measured by the pixels comprise the partially confocal intensity $I_1$ and the wide field intensity $I_W$. It is thus possible with a single partially confocal image to determine both intensities $I_1$ and $I_W$ that are required for the calculation of the elevation of the first location.

The above-described method for determining the partially confocal intensity $I_1$ (step S3.1) and the partially confocal intensity $I_1*$ (step S3.2) which corresponds to the point spread function PSF is repeated at a second measurement position $z_2$, from which the partially confocal intensity $I_2$ and a partially confocal intensity $I_2*$ which corresponds to the point spread function PSF are obtained. Further partially confocal imaging with a changed size of the pinhole (step S3.3) is not performed in the Airy microscope 100, but step S3.5 is modified as follows.

There are now three points of the point spread function PSF, specifically the intensities $I_1*$ and $I_2*$ corresponding to the point spread function PSF and the maximum value of the point spread function PSF, the intensity $I_{max}*$. The PSF, whose form is known, can be fitted on the basis of these values so that the Z coordinate $z_h$ of the maximum intensity $I_{max}*$ can be ascertained. Said z-coordinate $z_h$ corresponds to the elevation of the object 12 at the first location, such that the first location can be ascertained from the two partially confocal images at the measurement positions $z_1$ and $z_2$.

Figure 6:
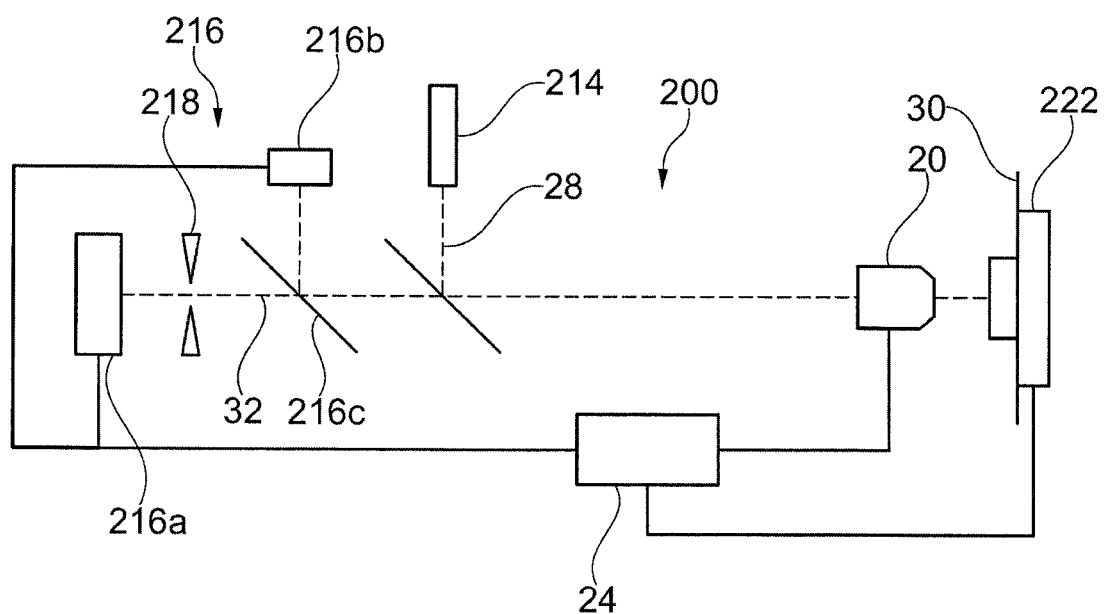
FIG. 6 shows a confocal topography microscope as a third embodiment of a microscope for performing the method.

A further embodiment of the microscope will be explained with reference to FIG. 6. FIG. 6 schematically illustrates a confocal topography microscope 200, which differs from the laser scanning microscope 10 and the Airy microscope 100 merely in the following differences:

The confocal typography microscope 200 has, analogously to the Airy microscope 100, a positioning device 222 which likewise comprises as a scanner for moving the sample holder 30. The embodiment of the positioning device is not relevant here either. A light source 214 can be embodied as a laser, a light-emitting diode (LED) or any other monochrome light source, but the use of a white light source, which produces light in the entire visible range, so that the object 12 is illuminated with illumination radiation in the visible wavelength range, is also possible.

A detector device 216 has a first camera 216a, a second camera 216b and a second beam splitter 216c. The second beam splitter 216c is embodied as a partially reflective mirror, which directs 50% of the radiation in the imaging beam path 32 onto the first camera 216a and 50% of the radiation in the imaging beam path 32 onto the second camera 216b. A pinhole device 218 is in the form of a mask having a plurality of gratings having different grating spacings, which is movable laterally through the imaging beam path 32.

The confocal topography microscope 200 can be used, owing to the second beam splitter 216c, to simultaneously produce an image in wide field using the second camera 216b, in front of which no pinhole is arranged, and a partially confocal image using the first camera 216a. The mode of operation to this extent coincides with the mode of operation of the Airy microscope 100, since here a partially confocal image and an image in wide field are also produced at the same time.

The invention claimed is:

1. A method for determining an elevation of an object at a lateral first location of the object and at least one laterally different second location of the object, using a microscope, which images the object with a point spread function in a z-direction that coincides with the elevation, comprising the following steps:
    imaging the object with the microscope at the lateral first location in wide field and determining a wide field intensity,
    calculating a maximum intensity expected at the first or second location by multiplying the wide field intensity with a specified scaling factor,
    partially confocally imaging the object at the first location with the focus at a measurement position in the z-direction and partially confocally imaging the object at the second location with the focus at the same or a different measurement position in the z-direction, wherein for the partially confocal recording a pinhole device having an opening which is greater than a diffraction limit is used, and wherein the partially confocal imaging establishes a depth of field range and the focus is situated in the depth of field range, and determining a first partially confocal intensity of the partially confocal image at the first location and a second partially confocal intensity of the partially confocal image at the second location,
    calculating a first intensity corresponding to the point spread function at the first location by way of subtraction between the first partially confocal intensity and the product of the wide field intensity and a specified linking factor and calculating a second intensity corresponding to the point spread function at the second location by way of subtraction between the second partially confocal intensity and the product of the wide field intensity and the specified linking factor,
    calculating a z-coordinate of the focus at which the point spread function is maximum using a previously known form of the point spread function, the calculated first and second intensities corresponding to the point spread function and the calculated expected maximum intensity, and
    using the z-coordinate as the elevation of the object at the first location.

2. The method according to claim 1, wherein the scaling factor is determined by the following steps:
    producing a z-stack by repeated partially confocally imaging a lateral first calibration location of a first calibration object or of the object with different foci which are shifted in the z-direction, and determining the partially confocal intensities for each of the partially confocal images,
    calculating an intensity profile in the z-direction at the first calibration location, and determining a maximum calibration intensity of the intensity profile at the first calibration location,
    imaging the first calibration location with the microscope in wide field, and determining a first calibration wide field intensity at the first calibration location, and
    calculating the scaling factor as a ratio between the maximum calibration intensity and the first calibration wide field intensity.

3. The method according to claim 1, wherein the linking factor is determined by the following steps:
    partially confocal imaging a lateral further calibration location of a second calibration object or of the object with the focus at a calibration measurement position in the z-direction which is situated in the depth of field range, and determining a calibration intensity of the partially confocal image at the further calibration location,
    confocally imaging the further calibration location with the focus at the calibration measurement position, and determining a confocal calibration intensity of the confocal image at the further calibration location,
    imaging the further calibration location with the microscope in wide field, and determining a further calibration wide field intensity at the further calibration location, and
    calculating the linking factor as a ratio between the difference between the partially confocal calibration intensity and the confocal calibration intensity to the further calibration wide field intensity.

4. The method according to claim 1, wherein the first location is imaged with the microscope in wide field and in that a current wide field intensity is determined at the first location.

5. The method according to claim 1, further comprising the following steps:
    partially confocally imaging the first location with the focus at least at two measurement positions which are spaced apart in the z-direction and are situated in each case in the depth of field range, and determining partially confocal intensities for each partially confocal image at the first location,
    calculating the intensities corresponding to the point spread function at the first location by way of a respective subtraction between the respective partially confocal intensity and a product of wide field intensity and the specified linking factor, calculating the z-coordinate using the form of the point spread function, the calculated intensities corresponding to the point spread function and the calculated expected maximum intensity.

6. The method according to claim 1, wherein for producing a live determination of an elevation of the object at the laterally second location of the object, which differs from the first one, the second location is imaged in partially confocal fashion and wherein, for calculating a z-coordinate at the second location, the z-coordinate of the focus at the first location is taken into consideration.

7. The method according to claim 1, further comprising the following steps:
partially confocally imaging the first location with at least two different pinholes and with the focus at a measurement position in the z-direction which is situated in the depth of field range, and determining a further partially confocal intensity for the partially confocal image with the further pinhole,
calculating the z-coordinate using the form of the point spread function, the calculated intensity corresponding to the point spread function, the further partially confocal intensity and the calculated expected maximum intensity.

8. The method according to claim 1, wherein a laser scanning microscope is used as the microscope, wherein the size of the pinhole is changed for partially confocal imaging and imaging in wide field.

9. The method according to claim 1, wherein a laser scanning microscope is used as the microscope, wherein, for partially confocal imaging and imaging in wide field, two detectors are provided behind a pinhole of different size or wherein a wide field camera is used for imaging in wide field.

10. The method according to claim 1, wherein a confocal topography microscope is used as the microscope, in which a grating is used as a pinhole, wherein a first camera with the grating is used for partially confocal imaging and a second camera is used for imaging in wide field.

11. The method according to claim 1, wherein a confocal Airy microscope is used as the microscope, in which the object is imaged onto a detector device which comprises a plurality of pixels and resolves a diffraction structure of the partially confocal image, wherein the wide field intensity and the partially confocal intensity are determined from one recording or wherein a wide field camera is used for imaging in wide field.

12. A microscope for producing a partially confocal image of an object and an image of the object in wide field, comprising:
a detector device,
a pinhole device for partially confocal imaging and recording in wide field,
a focusing device, which is embodied for setting a z-position of a focus of the partially confocal image, and
a control device for controlling the pinhole device, which is connected to the detector device,
wherein the microscope images the object in a z-direction, which coincides with the height direction of the object, with a point spread function,
wherein the control device is embodied to carry out the method according to claim 1.

13. The microscope according to claim 12, wherein a size of a pinhole of the pinhole device is adjustable.

14. The microscope according to claim 12, wherein the detector device comprises a first detector for partially confocal imaging and a second detector for imaging in wide field.

* * * * *